(12) United States Patent
Engel et al.

(10) Patent No.: US 11,684,920 B2
(45) Date of Patent: Jun. 27, 2023

(54) ELECTRICAL TRACKING OF A MULTIPHASE MICROFLUIDIC FLOW

(71) Applicant: International Business Machines Corporation, Armonk, NY (US)

(72) Inventors: Michael Engel, Rio de Janeiro (BR); Rodrigo Neumann Barros Ferreira, Rio de Janeiro (BR); Ronaldo Giro, Rio de Janeiro (BR); Mathias B. Steiner, Rio de Janeiro (BR)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 420 days.

(21) Appl. No.: 16/921,983

(22) Filed: Jul. 7, 2020

(65) Prior Publication Data

US 2022/0008919 A1 Jan. 13, 2022

(51) Int. Cl.
*B01L 3/00* (2006.01)
*G01N 27/12* (2006.01)
*G01N 35/10* (2006.01)

(52) U.S. Cl.
CPC ........ *B01L 3/502715* (2013.01); *G01N 27/12* (2013.01); *G01N 35/1072* (2013.01); *B01L 2200/10* (2013.01); *B01L 2300/041* (2013.01)

(58) Field of Classification Search
CPC .......... B01L 3/502715; B01L 2200/10; B01L 2300/041; G01N 27/12; G01N 35/1072

(Continued)

(56) References Cited

U.S. PATENT DOCUMENTS 6,990,849 B2 * 1/2006 Bohm ................ A61B 5/14532
422/68.1
7,725,267 B2 5/2010 Prabhakarpandian et al.
(Continued)

FOREIGN PATENT DOCUMENTS

CN 1847802 A 10/2006
CN 100491931 C * 5/2009
(Continued)

OTHER PUBLICATIONS

International Search Report and Written Opinion for Application No. PCT/IB2021/055421 dated Sep. 28, 2021, 10 pages.
(Continued)

*Primary Examiner* — Stephanie E Bloss
*Assistant Examiner* — Kevin C Butler
(74) *Attorney, Agent, or Firm* — Cantor Colburn LLP; Michael A. Petrocelli

(57) ABSTRACT

Provided are embodiments for a computer-implemented method, system, and device for tracking multiphase flow in a microfluidic device. Embodiments include receiving first readings from a first sensor of the microfluidic device, the first reading representing a detection of a fluid at an interface between the fluid and the first sensor, and receiving second readings from a second sensor of the microfluidic device, the second readings representing a detection of the fluid at an interface between the fluid and the second sensor, wherein the first sensor is located at a distance from the second sensor. Embodiments also include calculating a flow speed of the fluid in the microfluidic device based at least in part on a difference of time between the detections by the first sensor and the second sensor, and the distance between the first sensor and the second sensor.

20 Claims, 15 Drawing Sheets

(58) Field of Classification Search
USPC ....................................................... 73/64.56
See application file for complete search history.

(56) References Cited

U.S. PATENT DOCUMENTS

| | | | |
|---|---|---|---|
| 7,740,805 B2 * | 6/2010 | Parris ................ | B01L 3/502715 422/527 |
| 8,586,913 B2 | 11/2013 | Zhou et al. | |
| 9,221,050 B2 | 12/2015 | Etheredge, III et al. | |
| 9,670,775 B2 | 6/2017 | Tjhang et al. | |
| 10,495,594 B2 | 12/2019 | Lu et al. | |
| 11,059,043 B2 * | 7/2021 | Wang ................ | B01L 3/502784 |
| 11,351,540 B2 * | 6/2022 | Temiz ................ | B01L 3/502715 |
| 11,453,002 B2 * | 9/2022 | Oueslati ............ | B01L 3/502715 |
| 2005/0133101 A1 * | 6/2005 | Chung .............. | B01L 3/502738 137/833 |
| 2005/0210962 A1 * | 9/2005 | Bohm ................ | B01L 3/502715 73/53.01 |
| 2006/0223168 A1 * | 10/2006 | Parris ................ | B01L 3/502715 438/1 |
| 2009/0173166 A1 * | 7/2009 | Genosar .................. | G01F 1/708 73/861.05 |
| 2010/0261286 A1 | 10/2010 | Kim et al. | |
| 2012/0070878 A1 | 3/2012 | Fink et al. | |
| 2014/0138520 A1 * | 5/2014 | Liu .................... | H01L 27/14638 257/432 |
| 2020/0108385 A1 * | 4/2020 | Temiz ................ | B01L 3/502715 |
| 2021/0077996 A1 * | 3/2021 | Martin ...................... | B41J 2/195 |
| 2021/0237058 A1 * | 8/2021 | Gardner ................. | G01N 27/02 |
| 2021/0237059 A1 * | 8/2021 | Anderson ......... | B01L 3/502715 |
| 2022/0008919 A1 * | 1/2022 | Engel ................ | B01L 3/502715 |
| 2022/0097054 A1 * | 3/2022 | Hung ................ | B01L 3/502723 |

FOREIGN PATENT DOCUMENTS

| | | | | |
|---|---|---|---|---|
| CN | 113769802 A | * | 12/2021 | |
| DE | 102014209193 A1 | | 11/2015 | |
| EP | 1580552 A1 | * | 9/2005 | ......... A61B 5/14532 |
| EP | 2530167 A1 | | 12/2012 | |
| KR | 100540143 B1 | * | 6/2005 | ........ B01F 33/30352 |
| KR | 20110043621 A | | 4/2011 | |
| KR | 102363347 B1 | * | 7/2021 | ................ B01L 3/00 |
| TW | 202138805 A | * | 10/2021 | ........ B01L 3/502715 |
| WO | WO-2009089388 A1 | * | 7/2009 | ............. G01F 1/708 |
| WO | 2010004516 A1 | | 1/2010 | |
| WO | WO-2020032955 A1 | * | 2/2020 | ............ B01L 3/5027 |
| WO | WO-2021142044 A1 | * | 7/2021 | ........ B01L 3/502715 |
| WO | WO-2022009007 A1 | * | 1/2022 | ........ B01L 3/502715 |
| WO | WO-2022067184 A1 | * | 3/2022 | ........ B01L 3/502715 |

OTHER PUBLICATIONS

Aslam et al., "A High Resolution Capacitive Sensing System for the Measurement of Water Content in Crude Oil," Sensors 2014, 14, ISSN 1424-8220, pp. 11351-113561.

Chen et al., "Capacitive sensing of droplets for microfluidic devices based on thermocapillary actuation," The Royal Society of Chemistry, Lab on a Chip, 2004, 4, pp. 473-480.

Conchouso et al., "Capacitive Sensor for Continuous Monitoring of High-vol. Droplet Microfluidic Generation," Proceedings of the 11th IEEE Annual International, Conference on Nano/Micro Engineered and Molecular Systems (NEMS), Apr. 2016, 4 pages.

Dong et al., "Capacitance Variation Induced by Microfluidic Two-Phase Flow across Insulated Interditigal Electrodes in Lab-On-Chip Devices," Sensors 2015, 15, ISSN 1424-8220, pp. 2694-2708.

Link et al., "Electric Control of Droplets in Microfluidic Devices," Angew. Chem. Int. Ed. 2006, 45, pp. 2256-2560.

Van Dinther et al., "Suspension flow in microfluidic devices—A review of experimental techniques focussing on concentralion and velocity gradients," Advances in Colloid and Interface Science 173, 2012, pp. 23-34.

* cited by examiner

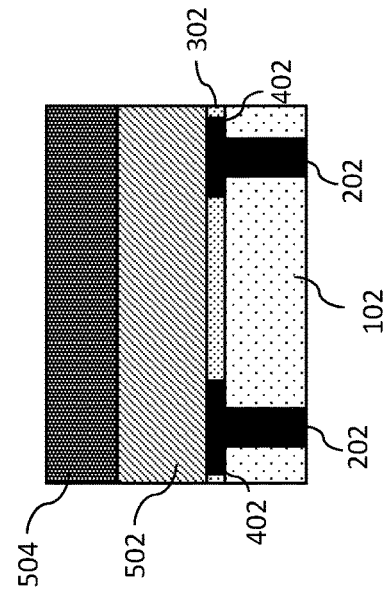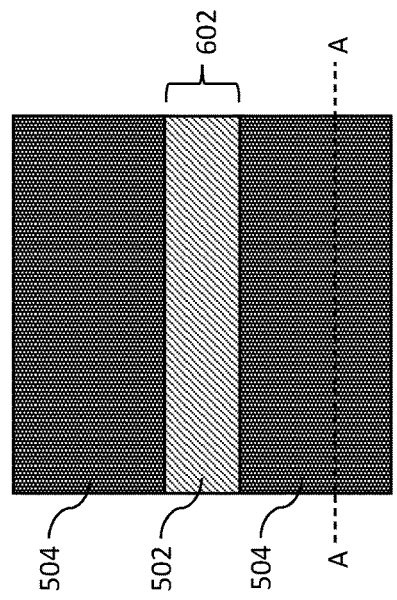
FIG. 5

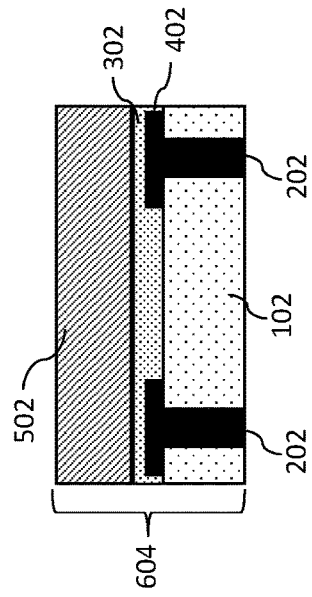
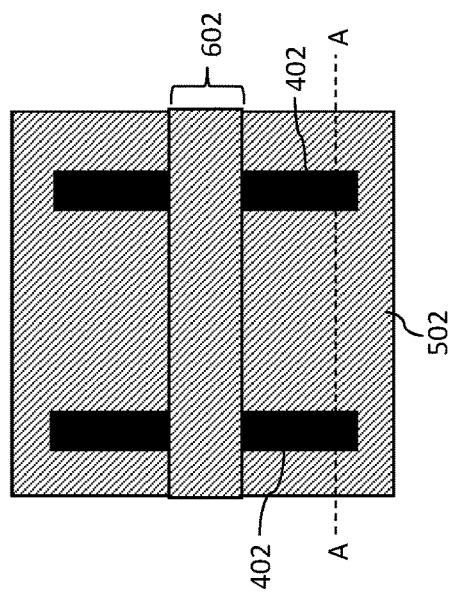
FIG. 6

ELECTRICAL TRACKING OF A MULTIPHASE MICROFLUIDIC FLOW

BACKGROUND

The present invention generally relates to fabrication methods and resulting structures for microfluidic devices. More specifically, the present invention relates to electrical tracking of multiphase flow in microfluidic devices.

Microfluidics involve the precise control and manipulation of small volumes of fluids that are typically constrained to micro scale channels and to volumes typically in the sub-microliter range. Microfluidic devices often involve microchannel circuits with multiple channels. Prominent features of microfluidics originate from the peculiar behavior that liquids exhibit at the micro scale. Flow of liquids in microfluidics is typically laminar. Volumes well below one nanoliter can be reached by fabricating structures with lateral dimensions in the micrometer range. Microfluidic devices generally refer to microfabricated devices, which are used for pumping, sampling, mixing, analyzing and dosing liquids.

SUMMARY

Embodiments of the present invention are directed to a computer-implemented method for electrical tracking of multiphase flow in microfluidic device. A non-limiting example of the computer-implemented method includes receiving, using a processor, first readings from a first sensor of the microfluidic device, the first reading representing a detection of a fluid at an interface between the fluid and the first sensor; receiving, using the processor, second readings from a second sensor of the microfluidic device, the second readings representing a detection of the fluid at an interface between the fluid and the second sensor, wherein the first sensor is located at a distance from the second sensor; and calculating, using the processor, a flow speed of the fluid in the microfluidic device based at least in part on a difference of time between the detections by the first sensor and the second sensor, and the distance between the first sensor and the second sensor.

Embodiments of the invention are directed to a system for performing electrical tracking of multiphase flow in a microfluidic device. A non-limiting example of the system includes a processor and a memory coupled to the processor. The processor is configured to receive first readings from a first sensors of the microfluidic device, the first reading representing a detection of a fluid at an interface between the fluid and the first sensor; receive second readings from a second sensor of the microfluidic device, the second readings representing a detection of the fluid at an interface between the fluid and the second sensor; and calculate a flow speed of the fluid in the microfluidic device based at least in part on a difference of time between the detection by the first sensor and the second sensor, and the distance between the first sensor and the second sensor.

Embodiments of the present invention are directed to a method of fabricating a microfluidic device for performing electrical tracking of a multiphase flow in a microfluidic device. A non-limiting example of fabricating the semiconductor device includes forming a first wafer comprising first terminals of a first sensor and a second sensor; forming a second wafer comprising second terminals of the first sensor and the second sensors; and bonding the first wafer to the second wafer, wherein the first terminals in the first wafer are aligned with the second terminals of the second wafer.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 5 depicts a top-down view and a cross-sectional line A-A view of a microfluidic structure after processing operations according to one or more embodiments of the invention;

FIG. 6 depicts a top-down view and a cross-sectional line A-A view of a microfluidic structure after processing operations according to one or more embodiments of the invention;

Figure 1:
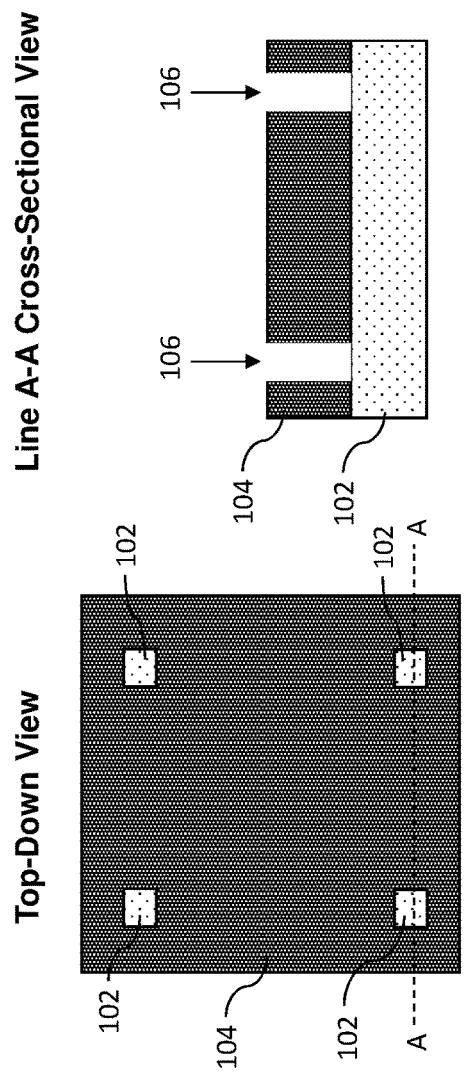
FIG. 1 depicts a top-down view and a cross-sectional line A-A view of a microfluidic structure after processing operations according to one or more embodiments of the invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the described embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

For the sake of brevity, conventional techniques related to semiconductor device and integrated circuit (IC) fabrication may or may not be described in detail herein. Moreover, the various tasks and process steps described herein can be incorporated into a more comprehensive procedure or process having additional steps or functionality not described in detail herein. In particular, various steps in the manufacture of semiconductor devices and semiconductor-based ICs are well known and so, in the interest of brevity, many conventional steps will only be mentioned briefly herein or will be omitted entirely without providing the well-known process details.

Turning now to an overview of technologies that are more specifically relevant to aspects of the invention, microfluidic devices have user chip interfaces and closed flow paths. Closed flow paths facilitate the integration of functional elements (e.g., heaters, mixers, pumps, UV detector, valves, etc.) into one device while minimizing problems related to leaks and evaporation. The analysis of liquid samples often requires a series of steps (e.g., filtration, dissolution of reagents, heating, washing, reading of signal, etc.). Having multiple channels on a single device increases its footprint and, thus, its fabrication costs.

In order to track multiphase displacement inside known microfluidic devices, optical methods can be used, which requires forming the microfluidic devices from materials that transmit light. Optical detection is also limited by diffraction and requires optical contrast between the phases or the use of fluorescent particles to track the flow.

Turning now to an overview of the aspects of the invention, one or more embodiments of the invention address the above-described shortcomings of the prior art by providing a microfluidic device having electrical sensors integrated therein. In embodiments of the invention, the integrated electrical sensors are configured and arranged to enable the microfluidic device to track fluid-fluid interfaces as a function of time, which further enables spatially-resolved and time-dependent information of the position of each phase in the multiphase system to be obtained and used for flow tracking. In some embodiments of the invention, the electrical sensors are capacitive sensors configured to measure capacitance, and each fluid that flows through the microfluidic device can exhibit different dielectric properties that can be measured by its effect on capacitance, which can be measured by one or more of the capacitive sensors. In embodiments of the invention, the electrical sensors are embedded into the channel walls to allow for measurement of the fluid electrical properties as a function of time, which enables tracking of the movement of the fluid-fluid interface.

A method in accordance with embodiments of the invention can include measuring the capacitance as a function of time at different points of the microfluidic device while multiphase (immiscible) flow is established. The capacitance signal is monitored for abrupt changes which reflect the passage of an interface between the two terminals. By using the distance between the sensors (which is known) and the time at which the fluid interface passes the different sensors, various figures-of-merit can be calculated including but not limited to the interface displacement speed, the channel saturation, and fluid wettability.

In one or more embodiments of the invention, the frequency at which the capacitance is measured can be tuned to the desired value/range. The frequency can be tuned to increase the contrast in capacitance between the fluid phases that one wishes to measure. Also, the frequency can be tuned to increase the sampling rate and captures higher interface speeds.

Turning now to a more detailed description of aspects of the present invention, FIG. 1 depicts a top-down view and a cross-sectional line A-A view of a structure 100 after an initial set of fabrication operations for forming a final microfluidic device according to one or more embodiments of the invention. In embodiments of the invention, known fabrication operations have been used to form and pattern a hard mask 104 on an oxide layer 102 of the structure 100. As best shown in the top-down view, the pattern in the hard mask 104 includes openings 106 that expose portions of the oxide layer 102.

In some embodiments of the invention, the hard mask 104 can include an oxygen containing layer such as a silicon-oxide ($SiO_2$) layer or silicon-oxynitride (SiON) layer; a layer that is substantially devoid of oxygen such as a silicon-nitride (SiN) layer or a silicon-carbide (SiC) layer; or a composite dielectric film that is substantially devoid of oxygen. In some embodiments of the invention, the hard mask 104 can be formed solely from tantalum nitride (TaN).

Figure 2:
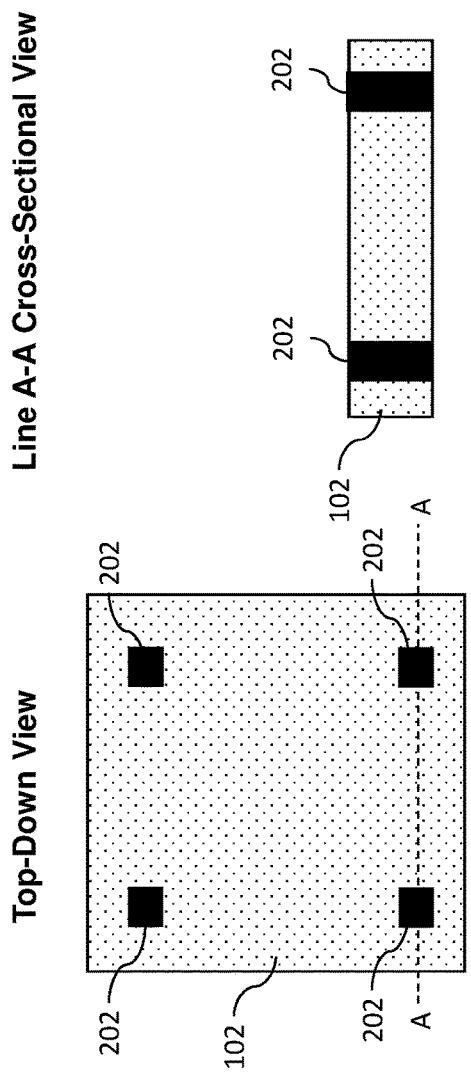
FIG. 2 depicts a top-down view and a cross-sectional line A-A view of a microfluidic structure after processing operations according to one or more embodiments of the invention.

FIG. 2 depicts a top-down view and a cross-sectional line A-A view of the structure 100 after processing operations according to one or more embodiments of the invention. As illustrated in FIG. 2, the hard mask 104 (shown in FIG. 1) has been removed. However, prior to removing the hard mask 104, an oxide etch has been performed to etch through the exposed portions of the oxide layer 102 and form trenches that have been billed with a metal to form contacts 202. In accordance with embodiments of the invention, each of the contacts 202 will function as a first terminal of a to-be-formed two-terminal sensor. The contacts 202 can be made of any suitable conducting material, such as, for example, metal (e.g., tungsten, titanium, tantalum, ruthenium, zirconium, cobalt, copper, aluminum, platinum), conducting metallic compound material (e.g., tantalum nitride, titanium nitride, tantalum carbide, titanium carbide, titanium aluminum carbide, tungsten silicide, tungsten nitride, cobalt silicide, nickel silicide), conductive carbon, or any suitable combination of these materials. In some embodiments of the invention, the contacts 202 include copper, cobalt, or tungsten. The conductive material used to form the contacts 202 can further include dopants that are incorporated during or after deposition. In some embodiments of the invention, the contacts 202 can include a barrier metal liners (not shown). In one or more embodiments of the invention, after the conducting material that forms the contacts 202 has been deposited, a chemical-mechanical planarization (CMP) is performed on the structure 100 to remove any excess conducting material and planarize the structure 100 to the level as shown.

Figure 3:
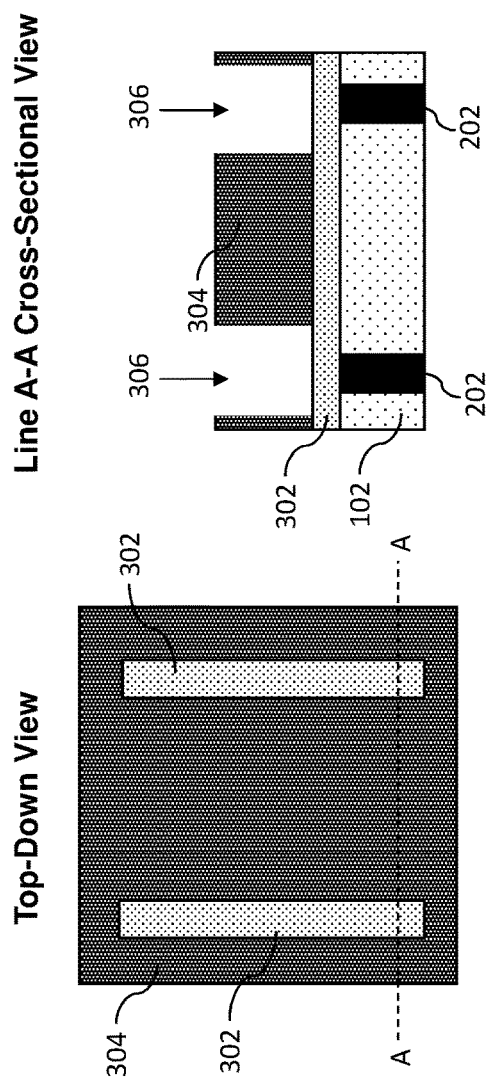
FIG. 3 depicts a top-down view and a cross-sectional line A-A view of a microfluidic structure after processing operations according to one or more embodiments of the invention.

FIG. 3 depicts a top-down view and a cross-sectional line A-A view of the structure 100 after processing operations according to one or more embodiments of the invention. As illustrated in FIG. 3, an additional oxide layer 302 has been deposited over a top surface of the oxide layer 102. In one or more embodiments of the invention, the oxide layer 302 can be the same material as the oxide layer 102. Any known manner of forming the oxide layer 302 can be utilized, such as, for example, chemical vapor deposition (CVD), plasma-enhanced CVD (PECVD), atomic layer deposition (ALD), flowable CVD, spin-on dielectrics, or physical vapor deposition (PVD).

Referring still to FIG. 3, a hard mask 304 has been formed over the oxide layer 302 and patterned to include openings that expose one or more portions of a top surface of the underlying oxide layer 302.

Figure 4:
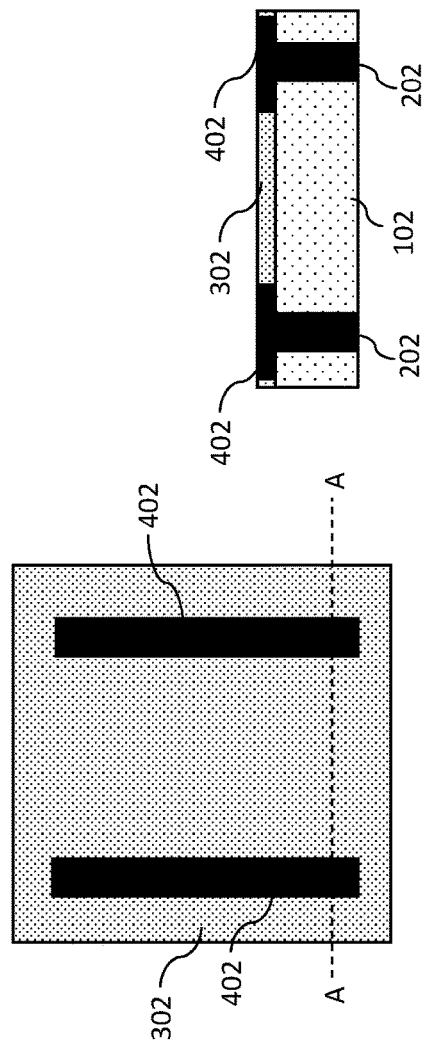
FIG. 4 depicts a top-down view and a cross-sectional line A-A view of a microfluidic structure after processing operations according to one or more embodiments of the invention.

FIG. 4 depicts a top-down view and a cross-sectional line A-A view of the structure 100 after processing operations according to one or more embodiments of the invention. As illustrated in FIG. 4, the hard mask 304 has been removed. However, prior to removing the hard mask 304 (shown in FIG. 3), portions of the oxide layer 302 not covered by the hard mask 304 were etched to form openings in the oxide layer 302. The openings in the oxide layer 302 have been filled with a metal to form bottom terminals 402 of the to-be-formed two-terminal sensors. In embodiments of the invention, the hard mask 304 can be removed by applying a CMP that removes the hard mask 304 and planarizes the structure 100 to the level shown in FIG. 4. The bottom terminals 402 are formed over the contacts 202.

FIG. 5 depicts a top-down view and a cross-sectional line A-A view of the structure 100 after processing operations according to one or more embodiments of the invention. As illustrated in FIG. 5, an oxide layer 502 has been deposited over the oxide layer 302 and the bottom terminals 402 of the structure 100. In one or more embodiments of the invention, the oxide layer 502 is the same material as the oxide layer 302 and/or oxide layer 102. Any known manner of forming the oxide layer 502 can be utilized.

As shown in FIG. 5, a hard mask 504 has been formed over the oxide layer 502. Any manner of forming the hard mask 504 can be used. The top-down view of the structure 100 shows that the hard mask 504 has been patterned to expose portions of a top surface of the oxide layer 502. An oxide etchant is applied to the structure 100, and the portions of the oxide layer 502 that are not covered by the hard mask 504 are etched to form a microchannel 602 in the oxide layer 502.

FIG. 6 depicts a top-down view and a cross-sectional line A-A view of the structure 100 after processing operations according to one or more embodiments of the invention. As illustrated in FIG. 6, after the oxide etch has been performed to form the microchannel 602 in the structure 100, the hard mask 504 (shown in FIG. 5) is removed, thereby forming a first wafer 604 including the microchannel 602. As shown, the first wafer 604 also includes the oxide layer 102, the contacts 202, the bottom terminals 402, the oxide layer 302, and the microchannel 602.

Figure 7:
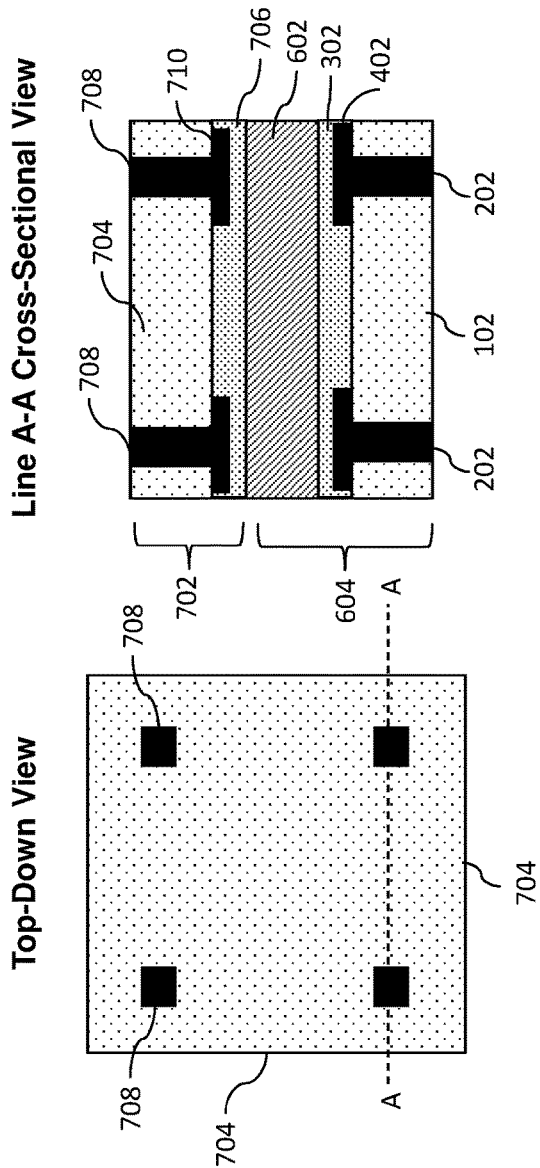
FIG. 7 depicts a top-down view and a cross-sectional line A-A view of a microfluidic structure after processing operations according to one or more embodiments of the invention.

FIG. 7 depicts a top-down view and a cross-sectional line A-A view of the structure 100 after processing operations according to one or more embodiments of the invention. As illustrated in FIG. 7, a complimentary wafer 702 has been formed and is similar to the first wafer 604 shown in FIG. 6. The complimentary wafer 702 includes an oxide layer 704, contacts 708 for top terminals 710 of the to-be-formed two-terminal sensors, and an oxide layer 706. In one or more embodiments of the invention, the complementary wafer 702 is formed without an element that corresponds to the microchannel 602 and includes the top terminals 710 that correspond to each of the bottom terminals 402 of the sensors formed in the first wafer 604. As shown in FIG. 7, the top terminals 710 of the complimentary wafer 702 are aligned with the bottom terminals 402 of the first wafer 604. The complimentary wafer 702 is bonded to the first wafer 604 to complete the formation of the structure 100 to form the microfluidic device. As shown, the oxide layer 706 of the complimentary wafer 702 is bonded to the microchannel 602 of the first wafer 604. It should be understood the bonding process can be performed using any of the known techniques. In a non-limiting example, the microfluidic device is formed with two sensors, where each sensor includes top terminals and bottom terminals which measure the capacitance as a fluid flows through the microchannel, however, it should be understood that any number of sensors can be included to obtain measurements during operation.

Figure 8:
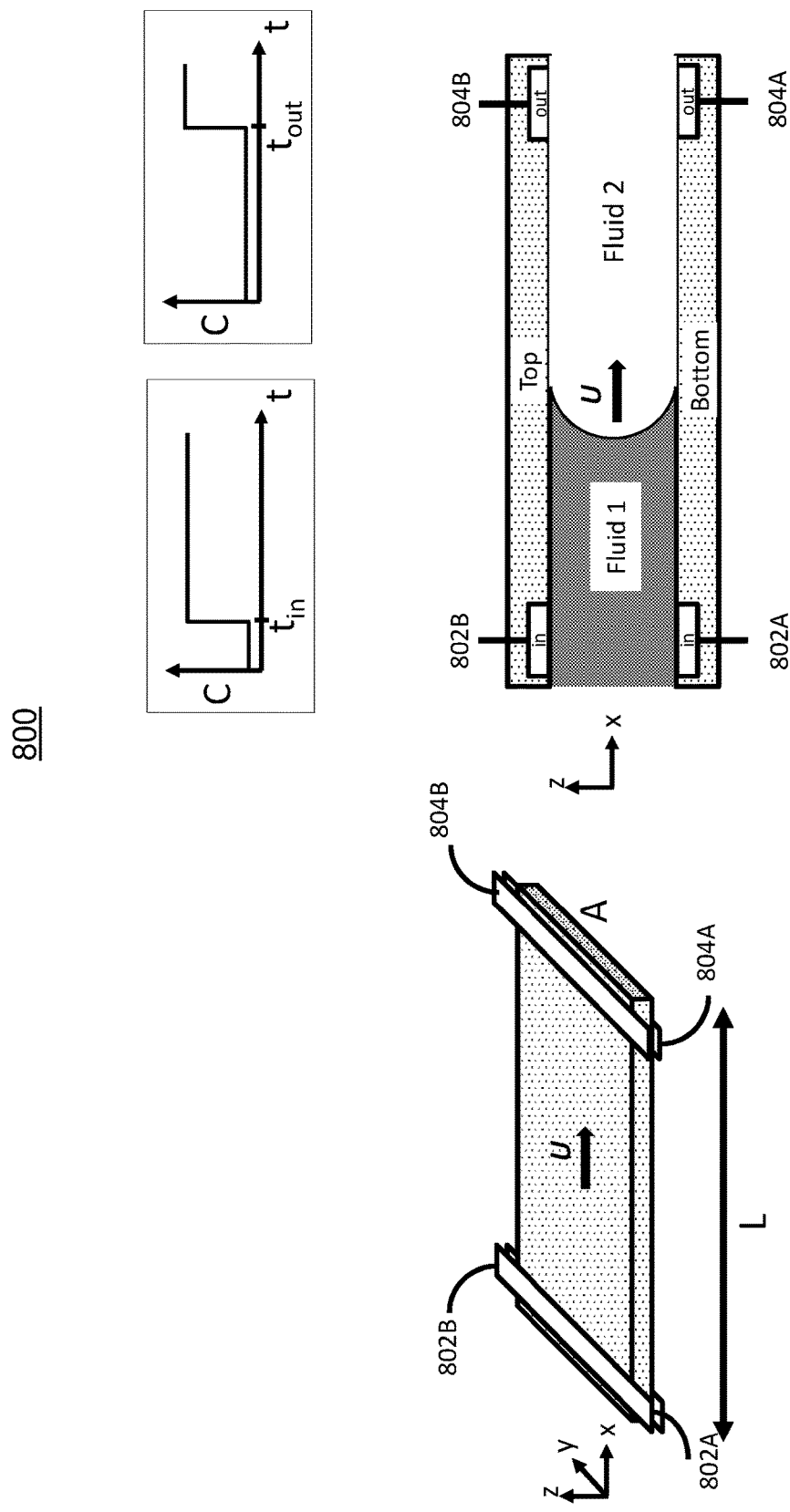
FIG. 8 depicts a microfluidic device in accordance with one or more embodiments of the invention.

FIG. 8 depicts a configuration 800 for monitoring the multi-phase flow within a cross-section of a microchannel in accordance with one or more embodiments of the invention. The microchannel includes two sensors in this non-limiting example. Each sensor includes top and bottom terminals and is used to measure the capacitance of a fluid. The movement of the fluid can be tracked in the microfluidic device and the fluid-to-fluid interface can be monitored. The first sensor 802 includes the first terminal 802A and the second terminal 802B, which corresponds to the bottom terminal 402 and top terminal 710 of FIG. 7, respectively. The second sensor 804 includes the first terminal 804A and the second terminal 804B. It should be understood that any number of sensors can be integrated into the microfluidic device to track the multi-phase fluid flow.

The distance L between the two sensors (capacitors) is known. The distance L can be selected for the desired application during fabrication of the microfluidic device. In this non-limiting example, the distance L is ~1 mm. The distance L between the sensors is divided by the difference in time the fluid interface is detected between the first sensor 802 and the second sensor 804 gives the average interface displacement speed U of the fluid in the microchannel, a figure-of-merit.

As shown in FIG. 8, the sensors (as shown in FIG. 7) are embedded in the walls of the microchannel and each sensor includes a top terminal and a bottom terminal. Also, the microchannel includes a first fluid (Fluid 1) and a second fluid (Fluid 2) which form a fluid-interface.

Also shown in FIG. 8 is a graph of the response for the first and second sensors 802, 804. The graph represents the capacitance on the Y-axis and units of time on the X-axis. A graph is shown for the inlet response and the outlet response which detects the fluid that is flowing in the microchannel where the fluid-to-fluid interface provides a change in capacitance. The first graph indicates the time a change in capacitance is detected at the first sensor at time $t_{in}$. The second graph indicates the time a change in capacitance is detected at the second sensor at time $t_{out}$.

By using the time information and the distance L information the interface displacement speed U in the microchannel can be calculated. It should be understood the sensors are coupled to a processor or computing unit (such as that shown in FIG. 15, discussed below), to process the signals. The interface displacement speed U can be calculated by the following Equation 1:

$$U_x = \frac{L}{\Delta t} \qquad \text{(Eq. 1)}$$

Figure 9:
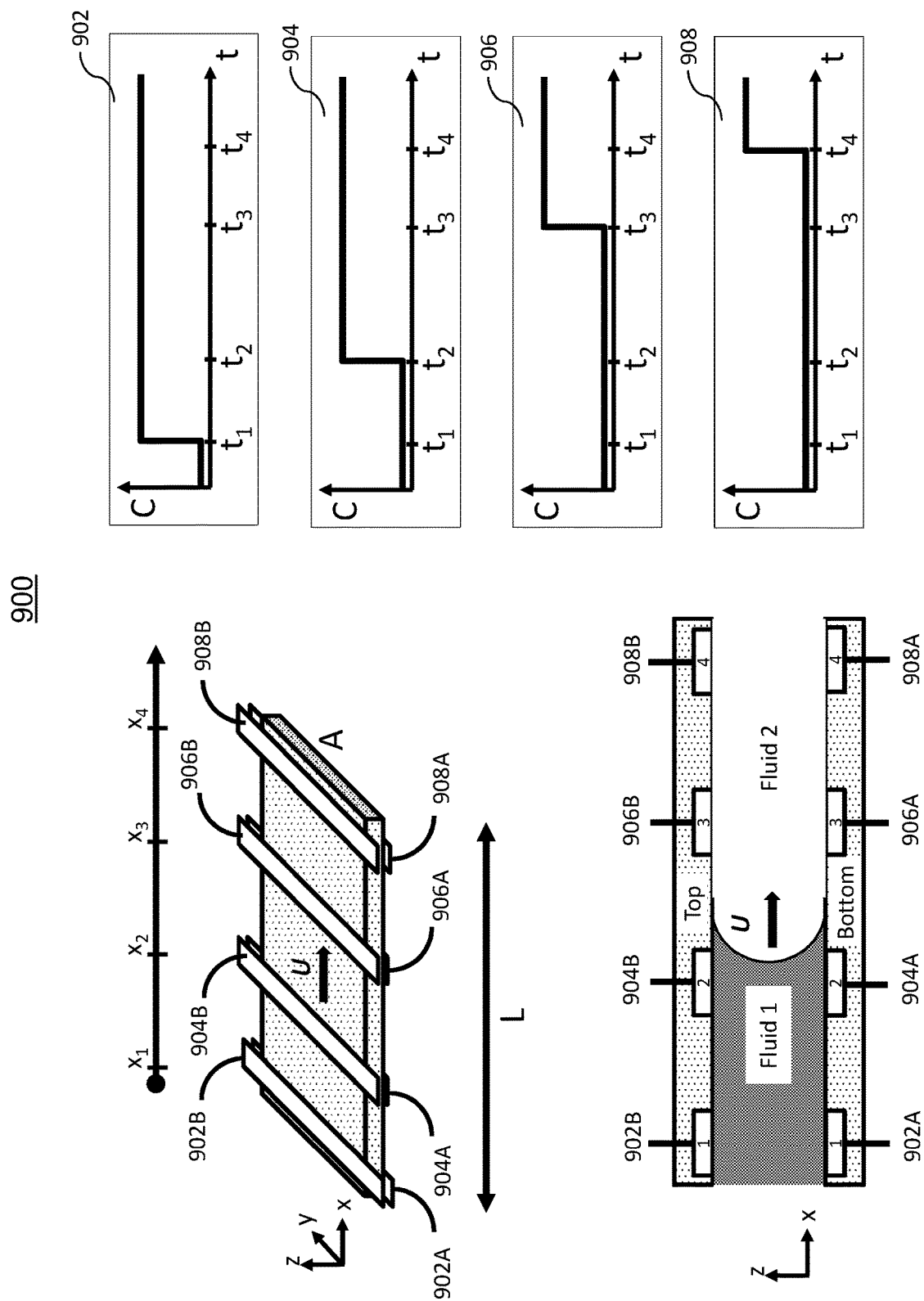
FIG. 9 depicts another microfluidic device in accordance with one or more embodiments of the invention.

FIG. 9 depicts another configuration of a system 900 for tracking the multiphase flow in a microfluidic device in accordance with one or more embodiments of the invention. The system 900 includes a series of sensors that are positioned at different positions $x_i$ along the direction of the fluid flow. Each sensor includes two terminals, a top terminal and a bottom terminal, and functions as a capacitor to detect the capacitance as the fluid passes the terminals. A first sensor at location $x_i$ includes terminals 902A, 902B, a second sensor is located at location $x_2$ includes terminals 904A, 904B, a third sensor at location $x_3$ includes terminals 906A, 906B, and a fourth sensor at location $x_4$ includes terminals 908A, 908B.

By calculating the fraction of the total length that the fluid-to-fluid interface has moved, the saturation (S) of the invading fluid (Fluid 1) can be obtained. The interface speed (U) and the saturation (S) can be calculated using the following Equations 2 and 3, respectively:

$$U(t_i < t < t_j) = \frac{x_j - x_i}{t_j - t_i} \quad \text{(Eq. 2)}$$

$$S(t > t_i) = \frac{x_i}{L} + (t - t_i) * U \quad \text{(Eq. 3)}$$

where t is a time, x is location of the sensor, l is the length of the microchannel; and i is the index of the first sensor; and j>i is the index of the second sensor.

As shown in the series of graphs in FIG. 9, the time at which each sensor 902, 904, 906, 908 detects the change in capacitance of the multi-phase flow is shown. By measuring the capacitance between the top and bottom terminals of each sensor as a function of time, the movement of the fluid-to-fluid interface in the channel can be tracked. The series of graphs illustrate that the first sensor 902 detects the change in capacitance, followed by the second sensor 904, third sensor 906 and the fourth sensor 908. By analyzing the fraction or portion of the microchannel the saturation of the microchannel can be determined.

Figure 10:
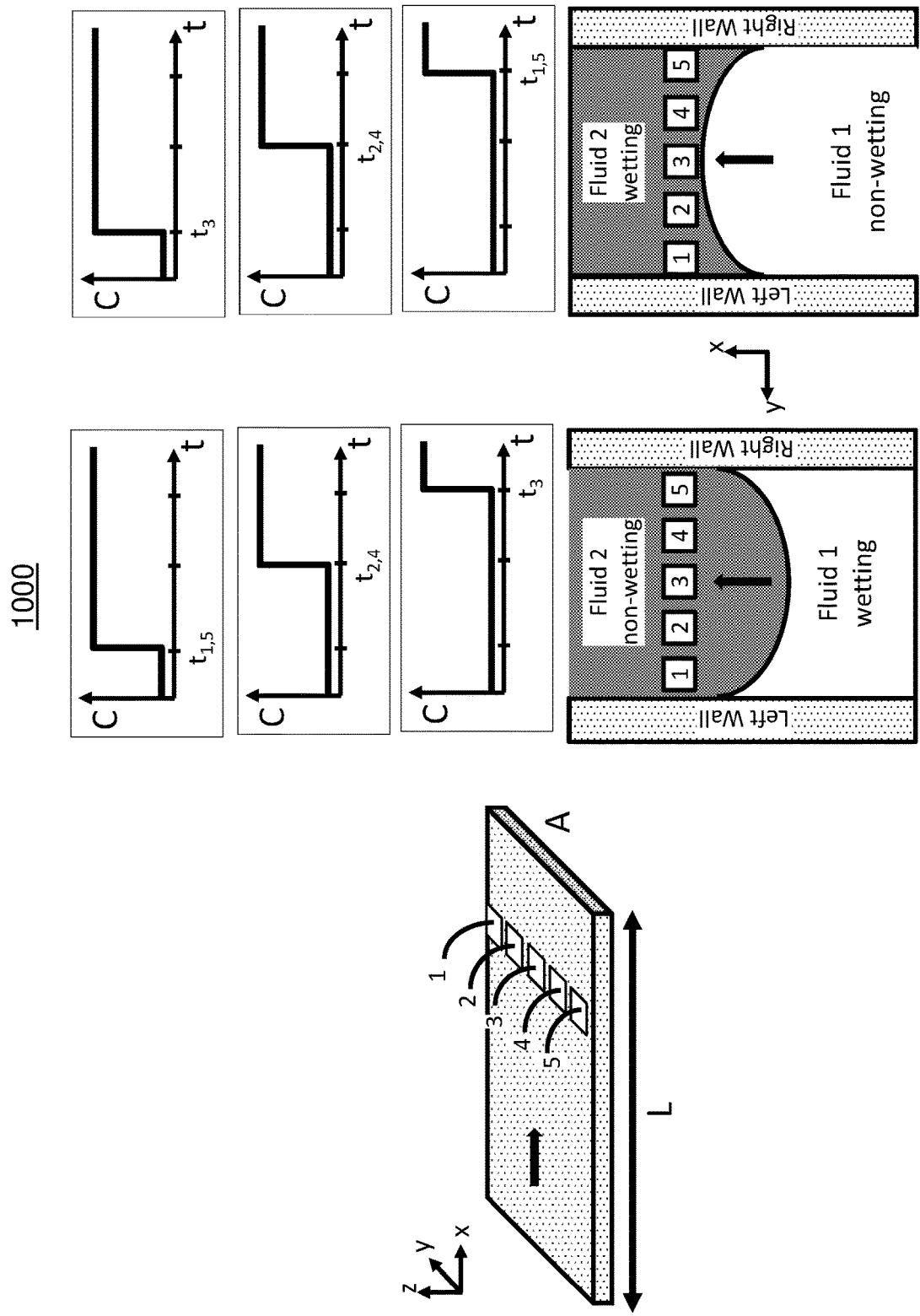
FIG. 10 depicts a different microfluidic device in accordance with one or more embodiments of the invention.

FIG. 10 depicts a different embodiment of the invention including a plurality of sensors 1, 2, 3, 4, 5 that are positioned in parallel across the microchannel of the device. As shown in FIG. 10, the sensor locations across the microchannel are known and can be used to determine the shape of the fluid interface as discussed below. Each sensor includes two terminals, a top terminal (shown in FIG. 10) and a bottom terminal (not shown), and functions as a capacitor to detect the capacitance as the fluid passes the terminals.

By using the architecture as shown in FIG. 10, the shape of the fluid-to-fluid interface can be determined which provides information on the wettability of the invading fluid. If the centermost sensor 3 detects a change in capacitance after the outermost sensors 1, 5, fluid 1 is wetting the surface ($t_3 > t_2$, $t_4 > t_1$, $t_5$). If the centermost sensor 3 detects a change in capacitance before the outermost sensors 1, 5, fluid 2 is wetting the surface ($t_3 < t_2$, $t_4 < t_1$, $t_s$). By determining whether the centermost sensor (sensor 3, in this case) detects the fluid interface first or last, the wettability characteristic of the invading fluid can be determined.

Figure 11:
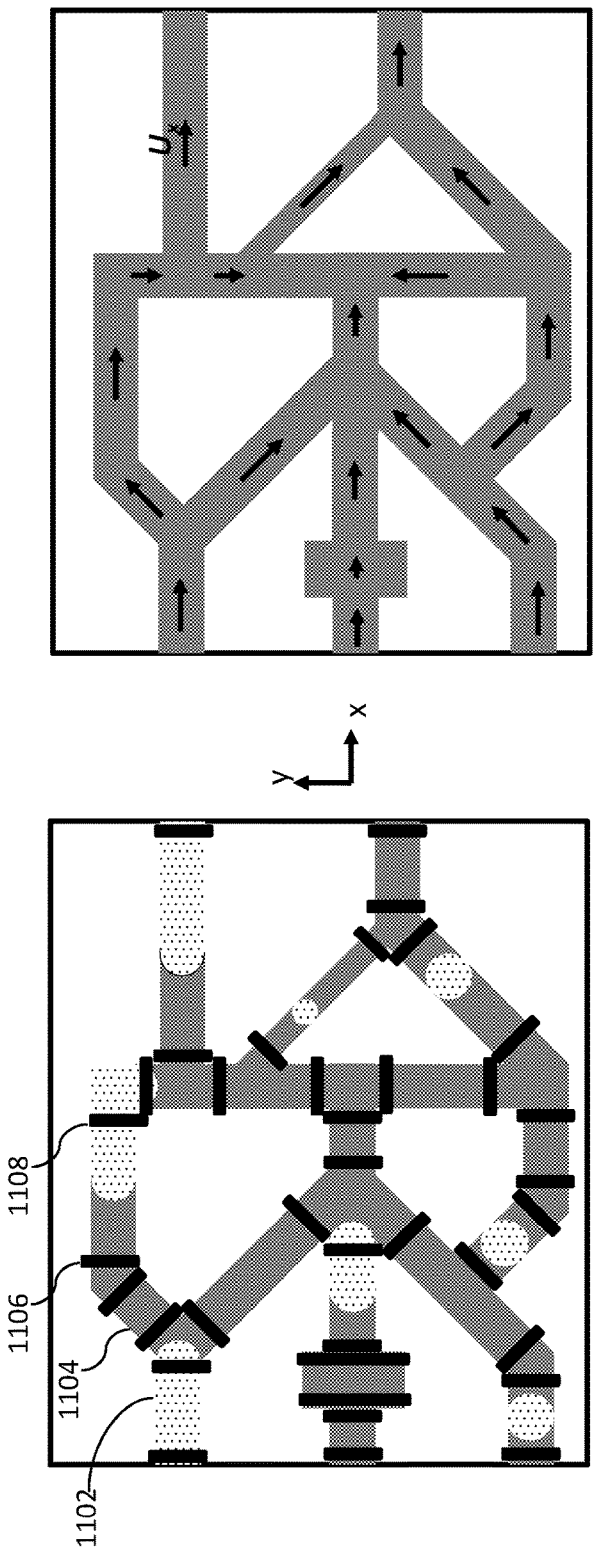
FIG. 11 depicts another microfluidic device in accordance with one or more embodiments of the invention.
Figure 12:
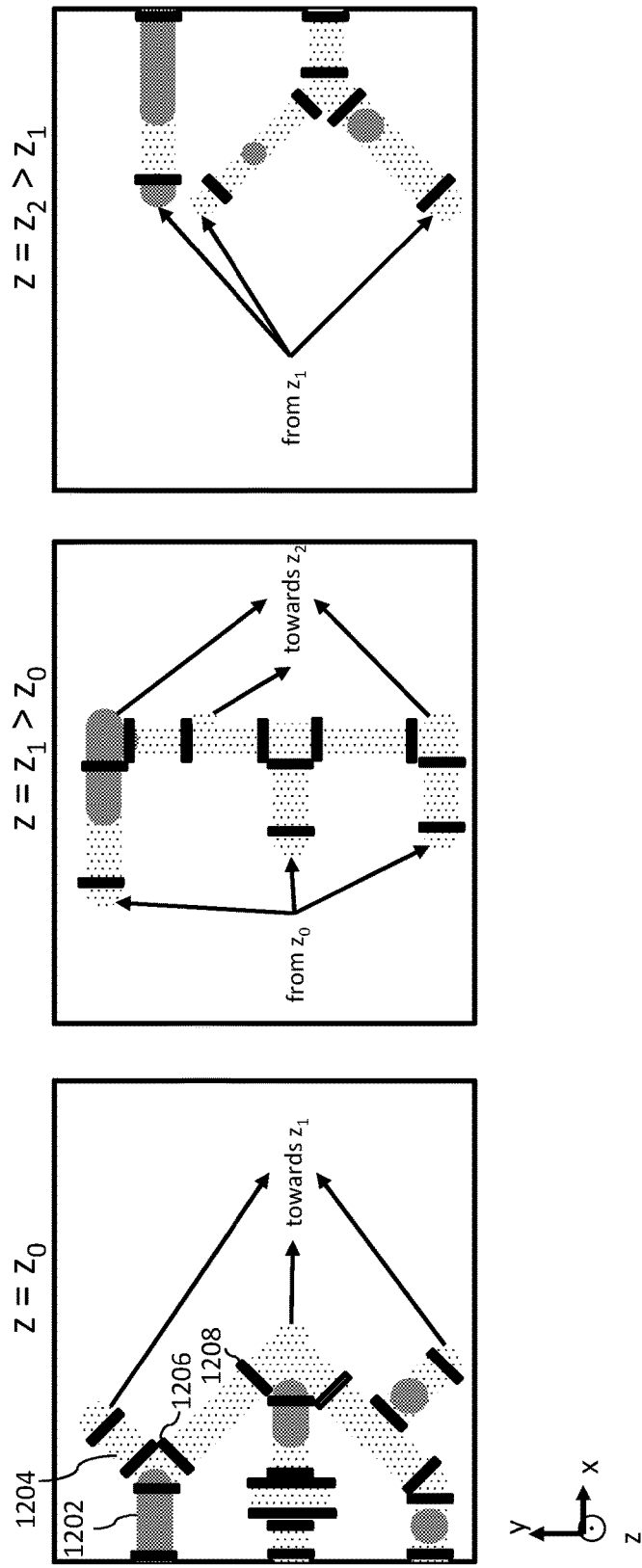
FIG. 12 depicts a microfluidic device in accordance with one or more embodiments of the invention.

FIG. 11 depicts another embodiment of the invention including a network 1100 of connected microchannels filled with at least two fluids (first fluid 1102, second fluid 1104) sustaining a multiphase flow. As shown a plurality of measurements can be obtained at the different locations in the network of microchannels. As shown, each segment of the network 1100 can include a pair of sensors, such as sensors 1106, 1108 to detect the inlet and outlet of the fluid through the segment of the network 1100 that is of interest. FIG. 12 depicts a network 1200 for a different embodiment of the invention, where the region of interest not only includes two-dimensional (xy) networks of connected microchannels but are stacked vertically (z) and connected bypass-through vertical channels. As shown in FIG. 12, each segment of the network 1200 can include a pair of sensors, such as sensors 1206, 1208 to detect the inlet and outlet of the fluid through the segment where the each sensor 1206, 1208 detects the fluid interface between a first fluid 1202 and a second fluid 1204.

Figure 13:
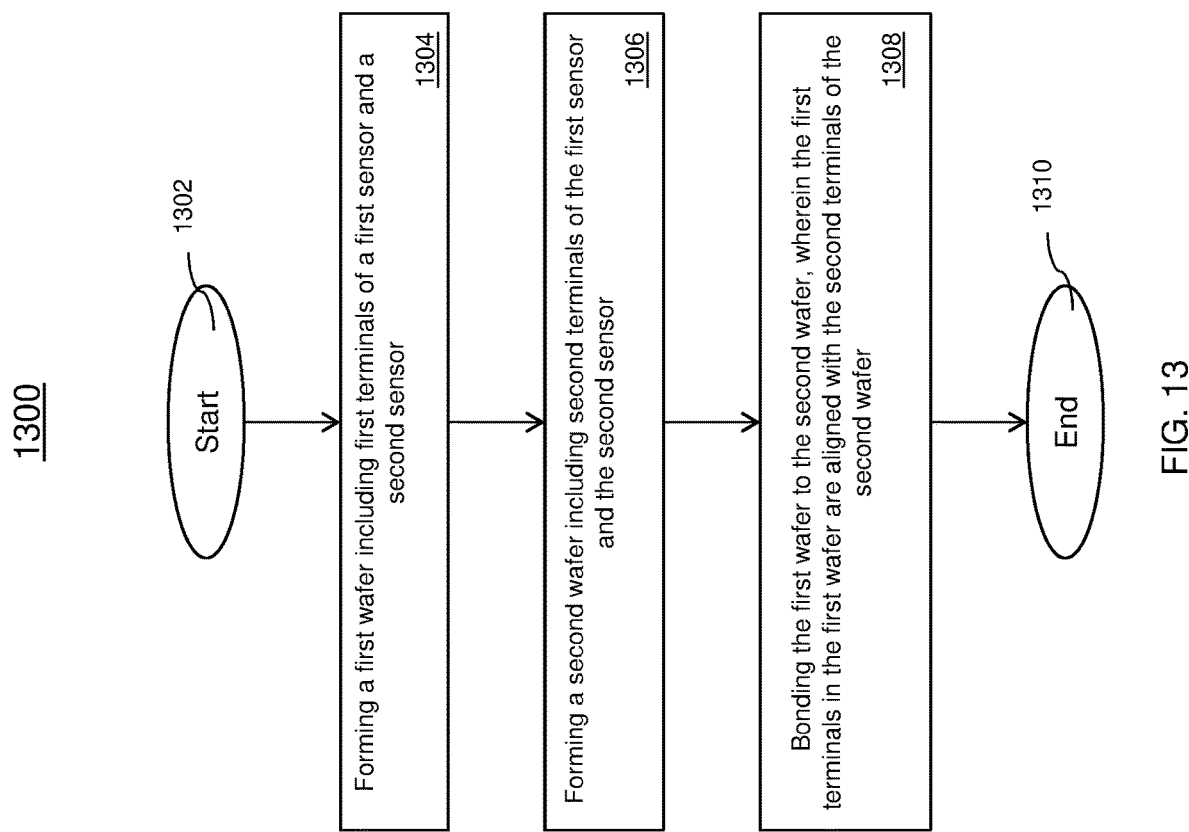
FIG. 13 depicts a flow diagram illustrating a method for fabricating a microfluidic device according to one or more embodiments of the invention.

FIG. 13 depicts a flowchart of a method 1300 for fabricating the microfluidic device in accordance with one or more embodiments of the invention. The microfluidic device can include the device such as that shown in FIG. 7. The method 1300 begins at block 1302 and proceeds to block 1304 which provides for forming a first wafer including first terminals of a first sensor and a second sensor. As shown in FIG. 6, the first terminals include contacts 202 and plates 402. Also, the first wafer includes the microchannel of the microfluidic device for transporting the fluid.

Block 1306 forms a second wafer including second terminals of the first sensor and the second sensors. As shown in FIG. 7, a complimentary wafer 702 is formed including the second terminals corresponding to the first terminals. The second terminals include contacts and plates similar to that formed in the first wafer.

Block 1308 bonds the first wafer to the second wafer, wherein the first terminals in the first wafer are aligned with the second terminals of the second wafer. The method 1300 ends at block 1310. The method 1300 is not intended to be limited by the steps shown in FIG. 13. It should be understood that different steps or a different sequence of steps can be used for the fabrication of the microfluidic device.

Figure 14:
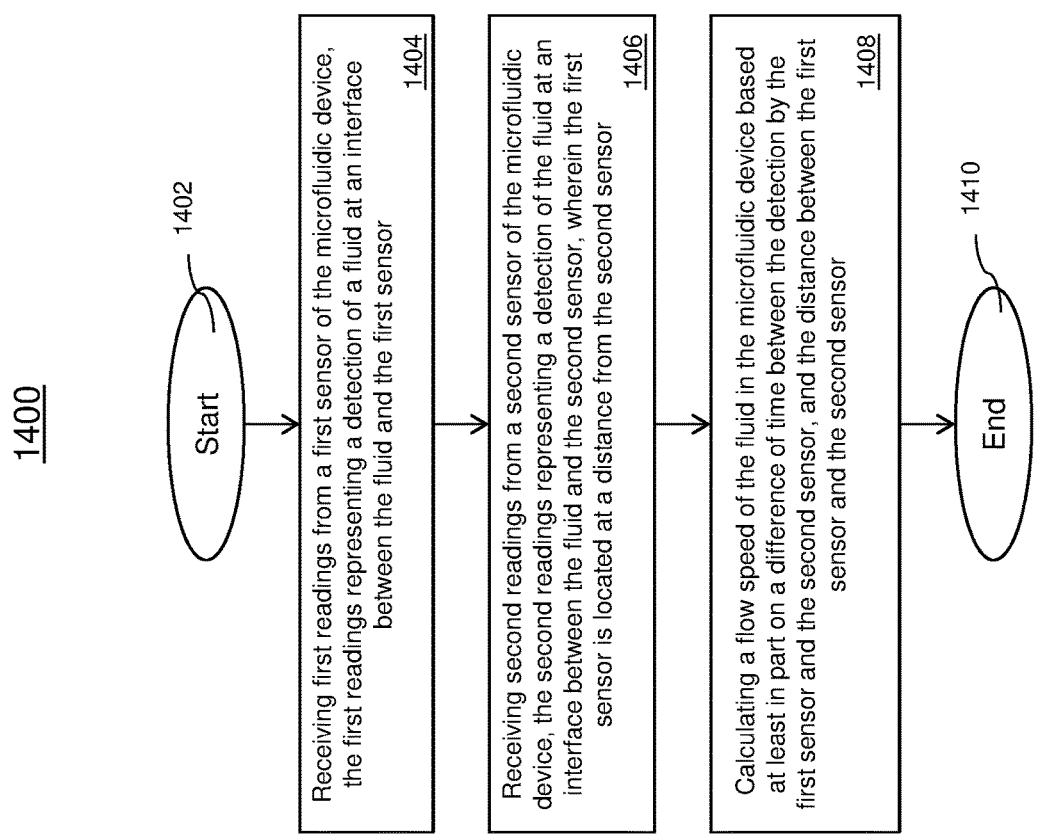
FIG. 14 depicts a flow diagram illustrating a method for tracking a multiphase fluid in a microfluidic according to one or more embodiments of the invention.

FIG. 14 depicts a flowchart of a method 1400 for performing electrical tracking of the multiphase flow in a microfluidic device. The method 1400 can be performed by any of the microfluidic devices shown in FIGS. 7-10 and the processing system such as that shown in FIG. 15. The method 1400 begins at block 1402 and proceeds to block 1404 which provides for receiving, using a processor, first readings from a first sensor of the microfluidic device, the first reading representing a detection of a fluid at an interface between the fluid and the first sensor. As the fluid interface between a first fluid and a second fluid passes the first sensor, the capacitance changes and is detected by the first sensor. The time at which the first sensor detects the fluid can be recorded.

Block 1406 receives, using the processor, second readings from a second sensor of the microfluidic device, the second readings representing a detection of the fluid at an interface between the fluid and the second sensor, wherein the first sensor is located at a distance from the second sensor. As the fluid interface between the first fluid and the second fluid continues to flow through the microchannel, it passes a second sensor. The second sensor measures the change in capacitance and the time of the detection can be recorded.

Block 1408 calculates a flow speed of the fluid in the microfluidic device based at least in part on a difference of time between the detection by the first sensor and the second sensor, and the distance between the first sensor and the second sensor. The (volumetric) flow rate can be calculated by dividing the flow speed by the cross-sectional area of the channel. In one or more embodiments of the invention, the calculation is performed by the processor described below with reference to FIG. 15. The calculation can be performed such at that shown in Equation 1 to obtain the interface displacement rate. In other embodiments of the invention, a plurality of sensors can be arranged in parallel or in series to obtain the figures-of-merit such the wettability of the fluid or the saturation of the channel. The calculations that are obtained can be performed in real-time to control the fluid flow by providing signals to a pump, regulator, etc. The method 1400 ends at block 1410. The method 1400 is not intended to be limited by the steps shown in FIG. 14. It should be understood that different steps or a different sequence of steps can be used for performing the tracking of a fluid interface in the microfluidic device.

Figure 15:
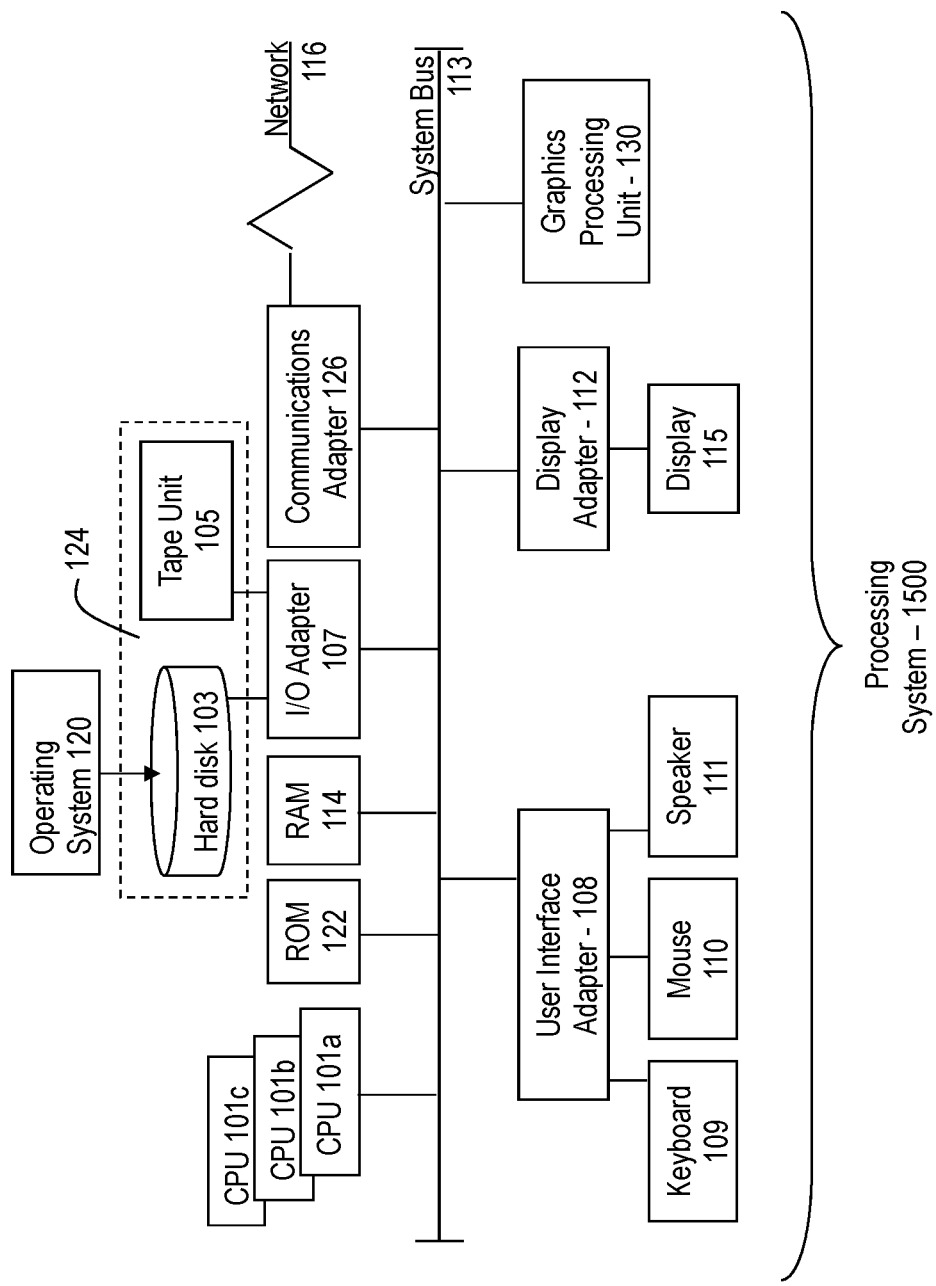
FIG. 15 depicts is a block diagram illustrating one example of a processing system for practice of the teachings herein.

Referring to FIG. 15, there is shown an embodiment of a processing system 1500 for implementing the teachings herein. In this embodiment, the system 1500 has one or more central processing units (processors) 101*a*, 101*b*, 101*c*, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 122 is coupled to the system bus 113 and may include a basic input/output system (BIOS), which controls certain basic functions of system 100.

FIG. 15 further depicts an input/output (I/O) adapter 107 and a network adapter 126 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 124. Operating system 120 for execution on the processing system 100 may be stored in mass storage 124. A network adapter 126 interconnects bus 113 with an outside network 116 enabling data processing system 1500 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 126, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 1500 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 15, the system 1500 includes processing capability in the form of processors 101, storage capability including system memory 114 and mass storage 124, input means such as keyboard 109 and mouse 110, and output capability including speaker 111 and display 115. In one embodiment, a portion of system memory 114 and mass storage 124 collectively store an operating system to coordinate the functions of the various components shown in FIG. 15.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The techniques of the embodiments of the invention described herein do not require sophisticated optical measurement equipment (high resolution, high sensitivity microscopes) to directly visualize and evaluate the fluid flow in contrast to existing architectures. In addition, the techniques described herein provide for very high integration density (3D integration) and can be scaled to the nanoscale and is compatible with standard semiconductor technology processes.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements.

Spatially relative terms, e.g., "beneath," "below," "lower," "above," "upper," and the like, can be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device can be otherwise oriented (rotated 90 degrees or at other orientations) and the spatially relative descriptors used herein interpreted accordingly.

The phrase "selective to," such as, for example, "a first element selective to a second element," means that the first element can be etched and the second element can act as an etch stop.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The term "conformal" (e.g., a conformal layer) means that the thickness of the layer is substantially the same on all surfaces, or that the thickness variation is less than 15% of the nominal thickness of the layer.

As previously noted herein, for the sake of brevity, conventional techniques related to semiconductor device and integrated circuit (IC) fabrication may or may not be described in detail herein. By way of background, however, a more general description of the semiconductor device fabrication processes that can be utilized in implementing one or more embodiments of the present invention will now be provided. Although specific fabrication operations used in implementing one or more embodiments of the present invention can be individually known, the described combination of operations and/or resulting structures of the present invention are unique. Thus, the unique combination of the operations described in connection with the fabrication of a semiconductor device according to the present invention utilize a variety of individually known physical and chemical processes performed on a semiconductor (e.g., silicon) substrate, some of which are described in the immediately following paragraphs.

In general, the various processes used to form a microchip that will be packaged into an IC fall into four general categories, namely, film deposition, removal/etching, semiconductor doping and patterning/lithography. Deposition is any process that grows, coats, or otherwise transfers a material onto the wafer. Available technologies include physical vapor deposition (PVD), chemical vapor deposition (CVD), electrochemical deposition (ECD), molecular beam epitaxy (MBE) and more recently, atomic layer deposition (ALD) among others. Removal/etching is any process that removes material from the wafer. Examples include etch processes (either wet or dry), and chemical-mechanical planarization (CMP), and the like. Semiconductor doping is the modification of electrical properties by doping, for example, transistor sources and drains, generally by diffusion and/or by ion implantation. These doping processes are followed by furnace annealing or by rapid thermal annealing (RTA). Annealing serves to activate the implanted dopants. Films of both conductors (e.g., poly-silicon, aluminum, copper, etc.) and insulators (e.g., various forms of silicon dioxide, silicon nitride, etc.) are used to connect and isolate transistors and their components. Selective doping of various regions of the semiconductor substrate allows the conductivity of the substrate to be changed with the application of voltage. By creating structures of these various components, millions of transistors can be built and wired together to form the complex circuitry of a modern microelectronic device. Semiconductor lithography is the formation of three-dimensional relief images or patterns on the semiconductor substrate for subsequent transfer of the pattern to the substrate. In semiconductor lithography, the patterns are formed by a light sensitive polymer called a photo-resist. To build the complex structures that make up a transistor and the many wires that connect the millions of transistors of a circuit, lithography and etch pattern transfer steps are repeated multiple times. Each pattern being printed on the wafer is aligned to the previously formed patterns and slowly the conductors, insulators and selectively doped regions are built up to form the final device.

The flowchart and block diagrams in the Figures illustrate possible implementations of fabrication and/or operation methods according to various embodiments of the present invention. Various functions/operations of the method are represented in the flow diagram by blocks. In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for tracking a fluid in a microfluidic device, the computer-implemented method comprising:
receiving, using a processor, first readings from a multi-terminal first sensor and a multi-terminal second sensor of the microfluidic device, the first readings representing a detection of a fluid at an interface between the fluid and a first terminal of the multi-terminal first sensor, the first readings further representing a detection of the fluid at an interface between the fluid and a first terminal of the multi-terminal second sensor;
receiving, using the processor, second readings from the multi-terminal first sensor and the multi-terminal second sensor of the microfluidic device, the second readings representing a detection of the fluid at an interface between the fluid and a second terminal of the multi-terminal first sensor, the second readings further representing a detection of the fluid at an interface between the fluid and a second terminal of the multi-terminal second sensor, wherein the multi-terminal first sensor is located at a distance from the multi-terminal second sensor; and
calculating, using the processor, a flow speed of the fluid in the microfluidic device based at least in part on a difference of time between the detections by the multi-terminal first sensor and the multi-terminal second sensor, and the distance between the multi-terminal first sensor and the multi-terminal second sensor.

2. The computer-implemented method of claim 1, wherein the time difference is measured between the first readings and the second reading.

3. The computer-implemented method of claim 1, wherein:
the multi-terminal first sensor is embedded within a first portion of a microchannel wall operable to define a first portion of a microfluidic channel of the microfluidic device;
the multi-terminal second sensor is embedded within a second portion of the microchannel wall operable to define a second portion of the microfluidic channel of the microfluidic device;
the first terminal of the multi-terminal first sensor is opposite the first terminal of the multi-terminal second sensor; and
the second terminal of the multi-terminal first sensor is opposite the second terminal of the multi-terminal second sensor.

4. The computer-implemented method of claim 1, wherein the multi-terminal first sensor and the multi-terminal second sensor are configured to detect a change in capacitance caused by the fluid flowing in the microfluidic device.

5. The computer-implemented method of claim 1, further comprising detecting the fluid interface using additional sensors, wherein the multi-terminal first sensor, the multi-terminal second sensor, and the additional sensors are aligned in parallel.

6. The computer-implemented method of claim 5, wherein detecting the fluid interface comprises detecting a center portion of the fluid and the edge portions of the fluid to determine a wettability of the fluid.

7. The computer-implemented method of claim 1, further comprising detecting, the fluid interface using additional sensors, wherein the multi-terminal first sensor, the multi-terminal second sensor, and the additional sensors are aligned in series.

8. The computer-implemented method of claim 7 further comprising determining a channel saturation of a microfluidic channel in the microfluidic device by performing the detection by the multi-terminal first sensor, the multi-terminal second sensor, and the additional sensors that are positioned in series along a direction of fluid flow in the microfluidic channel.

9. A system for tracking multiphase flow in microfluidic device, the system comprising:
a processor;
a memory coupled to the processor, the processor configured to:
receive first readings from a multi-terminal first sensor and a multi-terminal second sensor of the microfluidic device, the first readings representing a detection of a fluid at an interface between the fluid and a first terminal of the multi-terminal first sensor, the first readings further representing a detection of the fluid at an interface between the fluid and a first terminal of the multi-terminal second sensor;
receive second readings from the multi-terminal first sensor and a multi-terminal second sensor of the microfluidic device, the second readings representing a detection of the fluid at an interface between the fluid and a second terminal of the multi-terminal first sensor, the second readings further representing a detection of the fluid at an interface between the fluid and a second terminal of the multi-terminal second sensor; and
calculate a flow speed of the fluid in the microfluidic device based at least in part on a difference of time between the detection by the multi-terminal first sensor and the multi-terminal second sensor, and the distance between the multi-terminal first sensor and the multi-terminal second sensor.

10. The system of claim 9, wherein the time difference is measured between the detection at the first readings and the second readings.

11. The system of claim 9, wherein:
the multi-terminal first sensor is embedded within a first portion of a microchannel wall operable to define a first portion of a microfluidic channel of the microfluidic device;
the multi-terminal second sensor is embedded within a second portion of the microchannel wall operable to define a second portion of the microfluidic channel of the microfluidic device;
the first terminal of the multi-terminal first sensor is opposite the first terminal of the multi-terminal second sensor; and
the second terminal of the multi-terminal first sensor is opposite the second terminal of the multi-terminal second sensor.

12. The system of claim 9, wherein the multi-terminal first sensor and the multi-terminal second sensor are configured to detect a change in capacitance caused by the fluid flowing in the microfluidic device.

13. The system of claim 9, wherein the processor is further configured to detect the fluid interface using additional sensors, wherein the multi-terminal first sensor, the multi-terminal second sensor, and the additional sensors are aligned in parallel.

14. The system of claim 13, wherein detecting the fluid interface comprises detecting a center portion of the fluid and the edge portions of the fluid to determine a wettability of the fluid.

15. The system of claim 9, wherein the processor is further configured to detect the fluid interface using additional sensors, wherein the multi-terminal first sensor, the multi-terminal second sensor, and the additional sensors are aligned in series.

16. The system of claim 15, wherein the processor is further configured to determine a channel saturation of a microfluidic channel in the microfluidic device by performing the detection by the multi-terminal first sensor, the multi-terminal second sensor, and the additional sensors that are positioned in series along a direction of fluid flow in the microfluidic channel.

17. The system of claim 9, wherein the processor is further configured to tune a frequency of the multi-terminal first sensor and the multi-terminal second sensor for detecting the fluid interface based at least in part on a fluid type in the microfluidic device.

18. A method of fabricating a semiconductor device, the method comprising:
   forming a first wafer comprising a first terminal of a multi-terminal first sensor and a second terminal of the multi-terminal first sensor;
   forming a second wafer comprising a first terminal of a multi-terminal second sensor and a second terminal of the multi-terminal second sensor; and
   bonding the first wafer to the second wafer, wherein the first terminal in the first wafer is opposite the first terminal in the second wafer, and wherein the second terminal in the first wafer is opposite the second terminal of the second wafer.

19. The device of claim 18, further comprising forming a microchannel in the first wafer prior to bonding the first wafer to the second wafer.

20. The device of claim 18, wherein the multi-terminal first sensor and the multi-terminal second sensor are formed a distance L apart to performing tracking of a fluid.

* * * * *